Patented Apr. 13, 1943

2,316,371

UNITED STATES PATENT OFFICE 2,316,371

PLASTIC COMPOSITIONS

Corneille O. Strother, Buffalo, N. Y., assignor to Carbide and Carbon Chemicals Corporation, a corporation of New York No Drawing. Application November 21, 1939, Serial No. 305,451

10 Claims. (Cl. 260—86)

This invention pertains to novel plastic compositions composed of thermoplastic artificial resins or cellulose derivatives intimately mixed with solid heterocyclic keto-ethers of the group consisting of pyrones and pyronones which act to reduce the fusion temperature of such substances without causing them to be softened unduly at ordinary temperatures.

It has been discovered that such compounds, at temperatures above their melting points, which do not vary widely from 100° to 110° C., are excellent solvents for thermoplastic materials. Upon cooling the solutions thus formed, a hard material results which is non-extensible and resistant to fracture. The invention thus provides for the fabrication of solid articles from heat-sensitive plastic bodies at temperatures appreciably below those required to mold objects without internal strains from these materials. In addition, this discovery permits articles of intricate design to be formed with sharper impressions from thermoplastic molding materials since the molten solution fills the crevices of the mold more readily than the plastic alone when softened by heat. Furthermore, the expensive molding equipment ordinarily needed is not required.

It is also possible to make solid objects from the thermoplastic resins by the addition of an amount of a pyrone or a pyronone compound insufficient to form a fluid solution at elevated temperatures, but adequate to result in extremely viscous compositions from which molded articles can be fabricated by an extrusion or an injection process. This method has the advantage that the thermoplastic bodies, many of which are sensitive to thermal decomposition, need not be heated to high temperatures for the relatively long periods which are required in present processes for injection molding. In addition, the use of smaller amounts of the softening compounds is beneficial in that somewhat stronger articles of greater clarity are produced.

Pyronones, that is, compounds containing the pyronone ring,

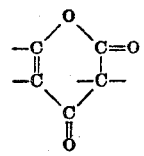

may be formed by the dimerization of diketene, or its isomers, analogues and homologues, as described in the application of A. B. Boese, Jr., Serial No. 83,930, filed June 6, 1936, now Patent 2,229,204. For example, dehydracetic acid, (6-methyl-3-acetopyronone) may be readily formed by the polymerization of two molecules of diketene. Examples of pyrones, that is, compounds containing the pyrone ring,

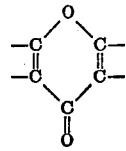

include dimethyl pyrone, diethylpyrone, and similar derivatives.

Typical of the thermoplastic artificial bodies which may be used in making the new plastic compositions are: (1) the vinyl resins which may be made by the polymerization of such vinyl compounds as vinyl formate, vinyl acetate, vinyl propionate, vinyl chloride, styrene, vinyl ethyl ether, and vinyl methyl ketone; (2) vinyl resins of the polyvinyl acetal type which may be produced by the condensation of polyvinyl alcohol with aldehydes; (3) the acrylate resins which may be formed by the polymerization of alkyl esters of acrylic or methacrylic acid; (4) resins of hydrocarbon nature such as may be obtained by the polymerization of butadiene, isoprene, butylene, and their halogen derivatives; (5) cellulose derivatives, such as nitrocellulose, cellulose acetate, and the like.

An outstanding class of resins to which the invention is applicable is the vinyl resins which may be made by the conjoint polymerization of vinyl halides with vinyl esters of lower aliphatic acids. Preferred resins within this group are those which may be formed by the conjoint polymerization of vinyl chloride with vinyl acetate to produce resinous products having a combined vinyl chloride content within the range 80% to 90% by weight and having an average macromolecular weight within the limits of 8,000 to 12,000. (Molecular weights referred to herein are obtained by means of Staudinger's formula from the specific viscosities of dilute solutions of the resins.* The application of this formula to resins of the above nature is discussed by Douglas and Stoops in Ind. and Eng. Chem., vol. 28, page 1152 (1936).)

The plastic compositions of this invention possess utility for other purposes than the preparation of solid articles. For instance, the plastic compositions may be used as adhesives and, for this purpose, the surfaces to be joined may be first coated with the hot fluid solution, for example by knife-coating or by roll-coating. The surfaces are then placed in contact under pressure; heating being required if the solution has solidified. Upon cooling, strong bonds between the surfaces result. This procedure is advantageous in that it does not require the use of volatile solvents which formerly were needed to first apply the thermoplastic medium in solution to the surfaces, which, after the solvent had evaporated, were joined by a hot-pressing operation. In a similar manner, the molten composition may be applied as a coating or finishing composition to paper, textile fabrics, leather, and similar materials. In this application, flexible films are obtained by virtue of their thinness rather than by any significant plasticizing action by the pyrone or pyronone compound.

In the adaptation of the plastic compositions for adhesives, it is possible to join surfaces by first covering them with a mechanical mixture of the thermoplastic substance with the selected pyrone or pyronone compound and subsequently applying heat and pressure to the assembled composite product. This serves the dual purpose of fusing the components of the plastic composition and of joining the surfaces. The method described is of particular utility in making laminated products from plywood.

Several examples will now be given to illustrate the several embodiments of the invention discussed above:

*Example I*

Fifty parts of a resin made by the conjoint polymerization of vinyl chloride with vinyl acetate and containing about 87% vinyl chloride and having an average macromolecular weight of about 10,000 were dissolved at 135° C. in 50 parts of dehydracetic acid (melting point 108° C.). Viscous solutions of a consistency somewhat greater than glycerine were obtained from which hard and durable objects could readily be cast. Less viscous molten solutions can be obtained by increasing the temperature, decreasing the concentration of resin, or by employing resins of lower macromolecular weight. For instance, 50% solutions by weight of a resin of the same chloride content, but having an average macromolecular weight of only about 5,000 to 7,000, have a viscosity approximately that of glycerine.

Similar articles were likewise obtained by casting molten solutions of highly polymerized polyvinyl acetate in dehydracetic acid.

*Example II*

This example illustrates the embodiment of the invention in which the amount of pyronone or pyrone compound used in conjunction with the thermoplastic material is less than that required to form a fluid solution therewith. For instance, 82 parts by weight of the conjoint polymer described in the preceding example were combined with 18 parts of dehydracetic acid at a temperature of about 135° C. to form an extremely viscous, semi-solid composition. Solid articles were fabricated from this both by an extrusion process and by blow molding. These objects were clear, hard, and strong; their clarity resulting from the fact that the limit of compatibility of the dehydracetic acid with this particular resin was not exceeded.

Plastic preparations softening at about 60° C., but strong and hard at ordinary temperatures, were prepared from the composition described above. These are useful for various purposes, such as for sealing and for filling crevices in wood and plaster, since they may be readily softened at workable temperatures.

*Example III*

Adhesive compositions may be prepared by incorporating dehydracetic acid with polyvinyl acetate. For example, 30 parts of the former, by weight, and 70 parts of the latter were made into a molten solution and applied to the surfaces of several materials, such as glass, rubber, cork, and metal foil. The coated surfaces were put in contact under heat and pressure and strong laminations were obtained when the assembly had cooled. Adhesive compositions of this nature may be marketed as a mechanical mixture of the dehydracetic acid with granules of the resin since it has been found that this prevents the particles of polyvinyl acetate, which has a low softening temperature, from cohering to form a solid block during shipment or storage in warm climates.

*Example IV*

Fifty parts of polystyrene by weight were dissolved in 50 parts of molten dehydracetic acid and the composition allowed to harden in the form of a thin film. This was then applied to flexible cardboard, of the type suitable for cartons, by a hot-pressing operation. The coating was free from pin-holes and was very resistant to oils.

*Example V*

Seventy parts by weight of ½ second viscosity nitrocellulose were incorporated with 30 parts of dehydracetic acid at a temperature of about 120° C. to form a viscous solution. Durable films, softening at about 100° C., were deposited from this solution. The term "thermoplastic" as used herein refers to substances which are normally solid and capable of repeated softening under heat.

Modifications of the invention other than as described will be readily apparent to those skilled in the art to which the invention appertains. For instance, stabilizing agents, pigments, dyes, fillers, and other conventional ingredients may be included in the plastic compositions. All such embodiments are included within the scope of the invention defined in the appended claims.

What is claimed is:

1. Normally solid, thermoplastic composition capable of fusing under heat comprising a heat-fusible, normally solid, thermoplastic, artificial resinous body intimately mixed with a fusion-temperature-lowering agent of the group consisting of pyrones and pyronones; both said composition and said resinous body being normally of substantially the same hardness, and said composition fusing at a lower temperature than said body.

2. Normally solid, thermoplastic composition capable of fusing under heat comprising a heat-fusible, normally solid, thermoplastic, artificial resinous body intimately mixed with dehydracetic acid; both said composition and said resinous body being normally of substantially the same hardness, and said composition fusing at a lower temperature than said body.

3. Normally solid, thermoplastic composition capable of fusing under heat comprising a heat-fusible, normally solid vinyl resin intimately mixed with dehydracetic acid; both said composition and said resin being normally of substantially the same hardness, and said composition fusing at a lower fusion temperature than said resin.

4. Normally solid, thermoplastic composition capable of fusing under heat comprising a heat-fusible, normally solid polyvinyl acetate resin intimately mixed with dehydracetic acid; both said composition and said resin being normally of substantially the same hardness, and said composition fusing at a lower temperature than said resin.

5. Normally solid, thermoplastic composition capable of fusing under heat comprising a heat-fusible, normally solid vinyl resin which is a conjoint polymer of vinyl chloride and vinyl acetate, intimately mixed with dehydracetic acid, both said composition and said resin being normally of substantially the same hardness, and said composition fusing at a lower temperature than said resin.

6. Normally solid, thermoplastic composition capable of fusing under heat comprising a heat-fusible, normally solid polystyrene resin intimately mixed with dehydracetic acid; both said composition and said resin being normally of substantially the same hardness, and said composition fusing at a lower temperature than said resin.

7. Process for making a hard, normally solid, thermoplastic composition of relatively low fusion temperature, which comprises, intimately mixing at an elevated temperature a fusion-temperature-lowering agent with a heat-fusible, normally solid vinyl resin to form an extremely-viscous-to-fluid dispersion, and causing said dispersion to harden by cooling it; said fusion-temperature-lowering agent being of the group consisting of pyrones and pyronones; both said composition and said resin being normally of substantially the same hardness, and said composition fusing at a lower temperature than said resin.

8. Process for making a hard, normally solid, thermoplastic composition of relatively low fusion temperature, which comprises, intimately mixing at an elevated temperature dehydracetic acid with a heat-fusible, normally solid vinyl resin which is a conjoint polymer of vinyl chloride with vinyl acetate, to form an extremely-viscous-to-fluid dispersion, and causing said dispersion to harden by cooling it; both said composition and said resin being normally of substantially the same hardness, and said composition fusing at a lower temperature than said resin.

9. Process for making solid articles of predetermined shape which comprises forcing into a mold a molten, extremely-viscous-to-fluid dispersion of a heat-fusible, normally solid vinyl resin with a fusion-temperature-lowering agent of the group consisting of pyrones and pyronones, and causing the dispersion to harden by cooling it; both said dispersion and said resin being normally of substantially the same hardness and said dispersion fusing at a lower temperature than said resin.

10. Process for making solid articles of predetermined shape which comprises forcing into a mold a molten, extremely-viscous-to-fluid dispersion of dehydracetic acid with a heat-fusible, normally solid vinyl resin which is a conjoint polymer of vinyl chloride with vinyl acetate, and causing the dispersion to harden by cooling it; both said dispesion and said resin being normally of substantially the same hardness and said dispersion fusing at a lower temperature than said resin.

CORNEILLE O. STROTHER.